Patented Jan. 6, 1942

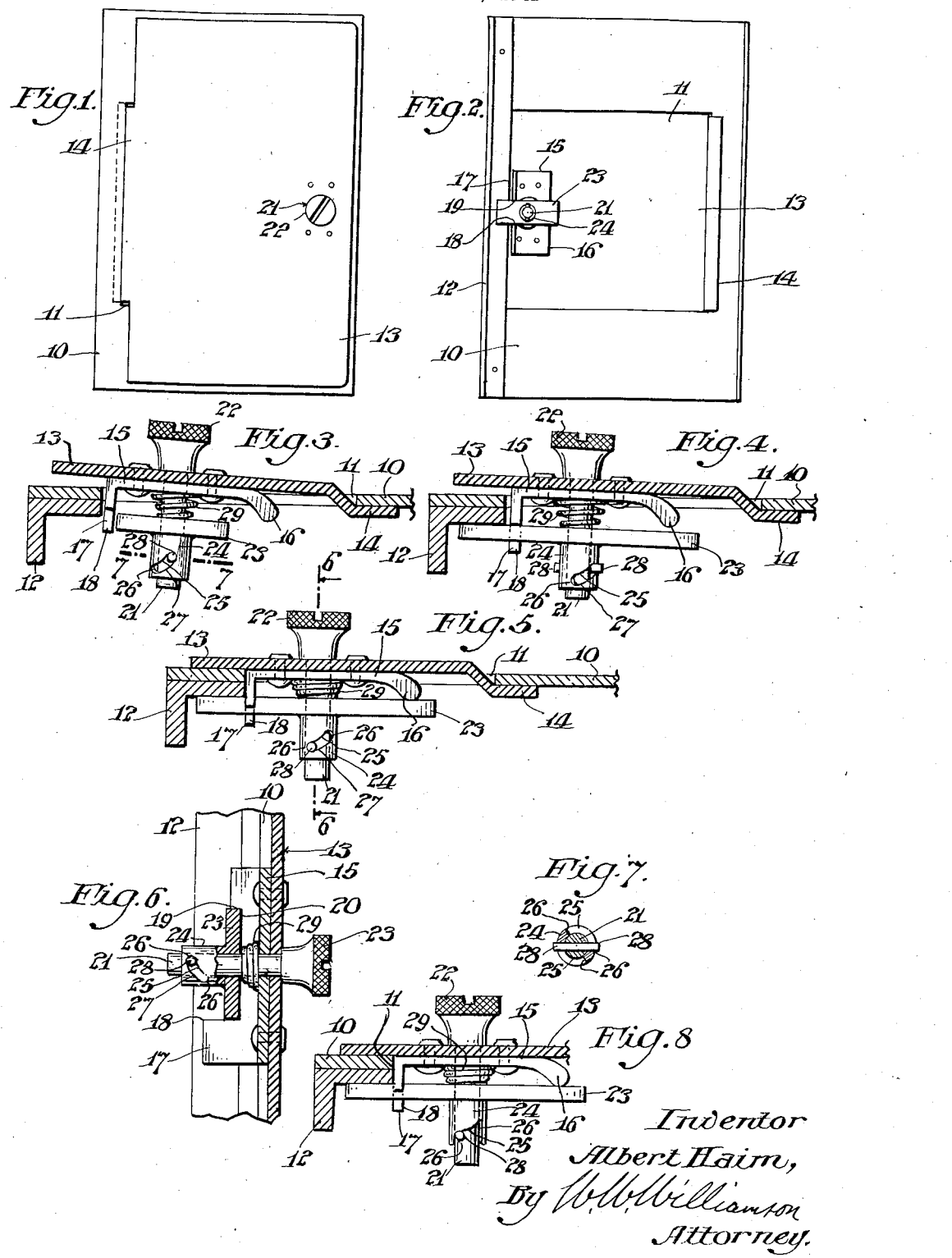

2,269,264

UNITED STATES PATENT OFFICE 2,269,264

SWING LOCK FASTENER

Albert Haim, Upper Darby, Pa.

Application March 4, 1941, Serial No. 381,606

3 Claims. (Cl. 292—62)

My invention relates to a new and useful swing lock fastener and has for one of its objects to provide an exceedingly simple and effective device of this character for securely fastening together two members, such as a frame and panel, or for holding one member in closed relation to another, such as a door relative to a cooperating wall. The fastener is especially adapted for use in aircraft construction for holding in place certain parts such as inspection plates, flooring, cowling and removable sections. It is to be understood that these are merely examples used for purpose of explanation of the invention and that such a fastener can be employed wherever applicable.

Another object of the invention is to provide a wing lock fastener including a bar to be rotated and moved to and fro by operating means which places said bar in or out of operative position and draws the same tight or releases it.

Another object of the present invention is to construct a swing lock fastener consisting of a bar carrying a sleeve having cam surfaces engaged by projections on a rotatable post which is rotatable and slidable, under certain conditions, relative to said bar.

A further object of this invention is to employ a spring or equivalent resilient means for urging the bar longitudinally in one direction along the post.

A still further object of the present invention is to provide stops which prevent rotation of the bar while the post is being turned during the tightening or releasing operations.

With the above and other objects in view, this invention consists of the details of construction and combination of elements hereinafter set forth and then designated by the claims.

In order that those skilled in the art to which this invention appertains may understand how to make and use the same, I will describe its construction, referring by numerals to the accompanying drawing forming a part hereof, in which:

Fig. 1 is a front elevation or face view of two members, one of which is held in a closed position by a swing lock fastener constructed in accordance with my invention.

Fig. 2 is a rear face view thereof.

Fig. 3 is an enlarged transverse sectional view of Fig. 2, showing the fastener in a fully unlocked position.

Fig. 4 is a similar view in a partially locked position.

Fig. 5 likewise is a similar view in a fully locked position.

Fig. 6 is a section on the line 6—6 of Fig. 5.

Fig. 7 is a section on the line 7—7 of Fig. 3.

Fig. 8 is a fragmentary sectional view similar to Fig. 5 showing a modification.

In carrying out the invention as herein embodied 10 represents a member, such as a wall, having an opening 11 therethrough and along one edge may be a strengthening strip 12. As herein illustrated, the opening is to be closed by a second member 13 or closure provided with an offset lip 14 for insertion in the opening 11 under an edge of the member 10 at one side of said opening. On a face of the member 13 is mounted a keeper plate 15 preferably having a ridge 16 formed along its rear edge and provided with a flange 17 at its front edge. This flange is fashioned to provide a long stop shoulder 18 in the path of forward travel of the rotatable bar, to be presently described, and a short stop shoulder 19 which, under certain conditions, will be disposed to the rear of said rotatable bar. Said stop shoulders are spaced apart and the formation thereof incidentally provides a notch 20.

A post or shank 21 is rotatably mounted in and projects through the member 13 and the keeper plate 15 with an enlargement or head 22 on the outer end of said post to provide a shoulder to prevent said post from being displaced inwardly. This enlargement may be of any suitable configuration so as to be rotatable by hand or by the use of a wrench or screw driver.

On the inner portion or end of the post opposite the enlargement 22 is slidably and rotatably mounted the bar 23 carrying a sleeve 24 on which are formed the oppositely disposed cam surfaces 25 extending in the same direction similar to a screw thread. Of course, a single cam surface will accomplish the result desired but by using two such surfaces the operating force is more evenly distributed.

The cam surfaces 25 can be provided by forming slots in the walls of the sleeve, as shown in Figs. 3 to 7 inclusive, or by producing them on the edges of portions of said sleeve, as by forming notches in the sleeve walls similar to the disclosure in Fig. 8. In either formation of the cam surfaces a contact shoulder 26 is provided at each end of each cam surface for a purpose to be hereinafter set forth. Where the cam surfaces are produced by forming slots actually duplex cams are provided consisting of the cam surfaces 25 and opposed parallel cam surfaces 27.

Cam followers 28 are carried by the post 21 and these may be the ends of a pin projected through said post and extending into the slots illustrated in Figs. 3 to 7 inclusive or into the notches depicted in Fig. 8.

The bar 23 and component parts are urged outwardly by a spring 29, preferably of the helical type, and in such case said spring encircles the post 21 and engages the keeper plate 15, as the stationary element, and the bar 23 as the movable element. Of course, where the cam surfaces are provided by the slot formations or duplex cam surfaces are otherwise provided, the spring can be dispensed with, but in such a case some means will be substituted therefor to prevent outward displacement of the post 21.

In actual practice, after the member 13 is placed in proper relation to the member 10, as shown in Fig. 3, and while the lugs 28 are in retracted positions, the post 21 is rotated in a direction to turn the bar 23 over the contiguous edge of the member 10 of the opening 11, thus fastening the member 13 to said member 10, as illustrated in Fig. 4. Although the two members are now fastened together, the joint may not be completely closed, but by continuing to rotate the post 21, the rotation of the bar having been stopped, the cam follower 28 will be caused to travel up the cam surfaces 25 to draw the member 13 tight against the member 10. This action will also position the stop shoulder 19 behind the bar 23.

To release the fastener, the post 21 is rotated in the reverse direction and since the bar 23 is temporarily held against rotation by the stop shoulder 19 the cam followers 28 will travel down the cam surfaces and by their engagement with the cam surfaces 27 or through the action of the spring 29 or both the member 13 will be moved away from the member 10 until the stop shoulder 19 is removed from the path of reverse travel of the bar 23. When the cam followers 28 engage the shoulders 26 at the lower ends of the cam surfaces said cam followers will pick up the bar 23 through the medium of the sleeve 24 and cause said bar 23 to rotate with the post 21 and disengage said bar from the edge of the member 10 or the parallel leg of the strengthening bar, if the latter is used. Thereafter the member 13 can be swung open or completely disengaged from the member 10.

It is to be particularly noted that during operation it requires only one-half of a turn of the post or screw to lock or unlock the fastener, that is, one-quarter of a turn swings the bar to an operative or inoperative position and one-quarter of a turn tightens or releases the grip.

Of course I do not wish to be limited to the exact details of construction herein shown and described, as these may be varied within the scope of the appended claims without departing from the spirit of my invention.

Having described my invention, what I claim as new and useful is:

1. A swing lock fastener comprising a supporting member, a post journalled on said supporting member, a bar slidably and rotatably mounted on said post, a sleeve carried by said bar and embracing the post, a cam surface on said sleeve, a shoulder at the low end of said cam surface, a high stop shoulder in the path of forward travel of the bar, an opposed low stop shoulder spaced from the high stop shoulder a distance at least equal to the width of said bar, a cam follower on the post for cooperation with the cam surface and contiguous shoulder whereby rotation of the post in one direction will turn the bar in the same direction and move said bar longitudinally of the post in a latching direction as the bar is arrested by the high stop shoulder, and when the post is rotated in the opposite direction said bar will be permitted to move longitudinally of the post in an unlatching direction while the bar is arrested by the low stop shoulder and then turn the bar in the opposite direction, and means to normally urge the cam surface against the cam follower.

2. In a device of the kind described, a supporting member, a keeper plate provided with a right angle flange, opposed stop shoulders on said flange, a rotatable post journalled on said supporting member, a bar slidably and rotatably assembled on said post, a sleeve carried by said bar and embracing the post, two pairs of parallel cam surfaces on said sleeve intermediate the ends thereof, shoulders at the ends of the pairs of cam surfaces, cam followers on the post cooperating with the cam surfaces and at least the shoulders at the lower ends of said cam surfaces, and a spring between said supporting member and said bar.

3. A swing lock fastener including a post rotatably mounted on a supporting member, a bar slidably and rotatably mounted on said post, a sleeve carried by said bar and having a smooth bore and embracing the post for rotary and sliding movements on said post, a cam surface on said sleeve, a shoulder at the low end of said cam surface, means to arrest the forward rotary movement of the bar, means to temporarily arrest the backward rotary movement of said bar, means on the post cooperating with the cam surface and the shoulder, and means to urge the bar away from said supporting member.

ALBERT HAIM.